US007593290B2

(12) United States Patent
Stange et al.

(10) Patent No.: US 7,593,290 B2
(45) Date of Patent: Sep. 22, 2009

(54) METHOD FOR DISPLAYING TIME-DEPENDENT PROCESSES AND TOOTHBRUSH

(75) Inventors: Pedro Stange, Eppstein (DE); Klaus Horbaschek, Frankfurt am Main (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 10/565,249

(22) PCT Filed: Jul. 19, 2004

(86) PCT No.: PCT/EP2004/008044

§ 371 (c)(1),
(2), (4) Date: Jun. 27, 2006

(87) PCT Pub. No.: WO2005/010624

PCT Pub. Date: Feb. 3, 2005

(65) Prior Publication Data

US 2007/0058490 A1 Mar. 15, 2007

(30) Foreign Application Priority Data

Jul. 19, 2003 (DE) ................................ 103 32 873

(51) Int. Cl.
*G04B 47/00* (2006.01)
*G01K 3/00* (2006.01)

(52) U.S. Cl. ......................... 368/10; 368/327; 116/206; 374/102

(58) Field of Classification Search ................... 368/10, 368/327; 374/102, 104–106; 116/206
See application file for complete search history.

(56) References Cited

U.S. PATENT DOCUMENTS

| | | | | |
|---|---|---|---|---|
| 4,229,813 | A | 10/1980 | Lilly et al. | |
| 4,802,255 | A * | 2/1989 | Breuer et al. | 15/207.2 |
| 4,911,038 | A * | 3/1990 | Ferrin | 81/3.09 |
| 5,528,563 | A | 6/1996 | Tothill et al. | |
| 5,633,836 | A * | 5/1997 | Langer et al. | 368/327 |
| 6,373,786 | B1 * | 4/2002 | Kagan et al. | 368/10 |
| 6,741,523 | B1 * | 5/2004 | Bommarito et al. | 368/327 |
| 6,916,116 | B2 * | 7/2005 | Diekmann et al. | 374/102 |
| 7,232,253 | B2 * | 6/2007 | Isbitsky et al. | 368/89 |
| 7,294,379 | B2 * | 11/2007 | Ko et al. | 428/40.1 |
| 2004/0013048 | A1 * | 1/2004 | Adamy | 368/327 |

FOREIGN PATENT DOCUMENTS

WO WO03/007088 1/2003

* cited by examiner

*Primary Examiner*—Vit W Miska
*Assistant Examiner*—Sean Kayes
(74) *Attorney, Agent, or Firm*—Fish & Richardson P.C.

(57) ABSTRACT

The invention relates to a display device (1) for time-dependent processes, especially for displaying the change of a used toothbrush. The display device (1) consists of a storage chamber (6) containing a liquid and a porous indicator strip (7), which is provided at one point with a dye (8) which dissolves in the liquid (5), which after dissolving in the liquid (5), colors the indicator strip (7) time-dependently over its length. The material of the indicator strip (7), the liquid (5) and the dye (8) are matched to one another such that dye molecules (18) can adhere to the indicator strip (7) until the boundary surfaces (19) of the pores (18) are covered with dye molecules (21) while the remainder of the dye molecules (21) diffuse further in the liquid (5) and the adhesion process thus proceeds time-dependently. This produces a sharp color front.

24 Claims, 1 Drawing Sheet

METHOD FOR DISPLAYING TIME-DEPENDENT PROCESSES AND TOOTHBRUSH

CROSS REFERENCE TO RELATED APPLICATIONS

This application is a national stage of PCT application serial number PCT/EP2004/008044, filed Jul. 19, 2004, which claims priority to German Patent Application No. 103 32 873.4, filed Jul. 19, 2003.

TECHNICAL FIELD

The disclosure relates to methods for displaying time-dependent processes and a toothbrush employing such methods.

BACKGROUND

U.S. Pat. No. 4,229,813 discloses a method in which at the beginning of the time measurement a liquid-filled capsule is pressed and its liquid is applied to the end of a strip of filter material printed with a dye. The liquid dissolves the dye in the strip and as a consequence of the diffusion which now occurs, the dye migrates along the strip in a predetermined time so that a user can identify how long the time measurement has been in progress from a scale applied to the front. In this arrangement it can be seen as less advantageous that the time elapsed can only be read off very inaccurately because no sharp edge of the dye is formed on the indicator strip.

Furthermore, a special combination of material to achieve a sharp front during a diffusion process used for time measurement is protected from the Japanese Patent Specification 1141976. In this case, the carrier material is agar-agar gel, the substrate or dissolving substance is water and the dye is methylene blue. Since the agar-agar gel used already contains the solvent water, the starting process appears to be relatively difficult. Furthermore, the gel variant has a large surface area which favors intensified drying out before the actual application of the time measurement.

Known from U.S. Pat. No. 4,802,255 is a toothbrush with a usage indicator wherein a dye contained in the toothbrush filaments gradually escapes with increasing use as a result of the action during cleaning of the teeth.

SUMMARY

According to one aspect, a method for displaying a time-dependent process includes releasing a liquid from a storage chamber onto a indicator strip such that the color front is imaged over several months so that the time elapsed can be read off clearly according to a time scale positioned adjacent to the indicator strip. At the same time, it should be possible to implement the display device using simple means and extremely cheaply.

In various implementations, a toothbrush employs the method described above to provide an easy-to-handle usage display.

Since the porous support material is conditioned such that the dye molecules adhere to its inner surface, a sharp color front is formed which precisely reveals to an operator what time has elapsed since the beginning of the time measurement. The water (or solvent) and dye molecules undergo Brownian molecular motion, i.e. they move to and fro in microscopically small chambers in the fabric structure and deposit on the boundary surfaces. The remainder of the dye molecules migrate further in the diffusion process and attempt to deposit on other, still free boundary surfaces. At the point where dye molecules are already deposited, no further dye molecules can be deposited and this dye is thus transported further by the diffusion process in the solvent. Since the diffusion process is a temporarily predefined process in any substance, the diffusion rate can be predetermined by the choice of dye, the material of the indicator strip and the selected liquid in order to obtain time measuring devices for different time intervals in this way.

In order to obtain this sharp diffusion front, the combination must thus be selected so that small quantities of dye can adhere to the support material. The diffusion of the dye molecules bound to the support material must be significantly slower than the dye molecules located freely in the solvent. In addition, at higher concentrations the dye may no longer be completely bound by the support material. The material of the indicator strip, the liquid and the dye are matched to one another so that the dye molecules can adhere to the indicator strip until the boundary surfaces of the pores are covered with dye molecules while the remainder of the dye molecules diffuse further into the liquid so that the adhesion process proceeds in a time-dependent manner.

In one variant the liquid is dissolved in the storage chamber. After the contents of the storage chamber have been brought in communication with the indicator strip, the gradual diffusion of the dye along the indicator strip shows the usage here.

An extremely sharp separation layer is formed if the dye consists of “Erythrosin B” C.I. 45430 (red dye) from SIGMA-ALDRICH Chemie GmbH, Postfach 1161, D-82018 Taufkirchen and the indicator strip consists of cellulose filter paper. The abbreviation C.I. stands for color index. Here water is used as liquid. In this arrangement the indicator strip is colored red. The sharp front (diffusion front) is thus achieved by means of a suitable combination of dye, solvent and porous indicator strip which is the support material.

In order to achieve the same effect and indication but in a blue dye, the dye “Coomassie Brilliant Blue G 250” (C.I. 42655) is provided which can be ordered from the company VWR International GmbH, Hilpertstrasse 20a in D-64259 Darmstadt. The abbreviation C.I. stands for Color index.

As a result of the fact that the liquid to be applied to the indicator strip is no longer applied directly to the area of the indicator strip provided with a dye but to the position on the indicator strip opposite to the dye, as a result of capillary forces or as a result of other flow mechanisms, the liquid initially migrates on the indicator strip in the direction of the colored area, that is toward the partial area provided with dye from the beginning, until it reaches this area. This process takes place in a very short time so that the dyes in the indicator strip are then mixed with the liquid and dissolved. Since the entire indicator strip is thus moistened and the liquid dissolves the dye, the dye begins to diffuse back toward the storage chamber in the indicator strip in the direction of the scale. At the same time dye particles are deposited at the porous edge position of the indicator strip while the excess portion diffuses further toward the end of the indicator strip which has not yet been colored. A relatively high-contrast boundary layer between the dye layer and the differently colored remainder of the indicator strip is hereby produced. The longer the diffusion time of the dye, the longer the time measurement can take place.

In one embodiment, the indicator strip is enclosed in a protective cladding to substantially reduce or prevent the possibility of the indicator drying out and thus remaining moist so that a time measurement can be carried out over a very long time.

In some embodiments, the substantially watertight protective cladding for the indicator strip also surrounds a dense storage chamber which, as soon as it is opened, delivers its water to the indicator strip which then retains it therein as a result of the watertight protective cladding.

In some embodiments, the time measurement commences when the storage chamber is simply pressed together so firmly by the hand of an operator. A portion of the chamber bursts and the liquid passes over into the indicator strip. Naturally, other opening mechanisms can also be selected for a storage chamber, such as for example an overpressure valve constructed on the storage chamber or an intervention by means of thermal action.

According to another aspect, a toothbrush includes a capsule to store a liquid and comprising a seal for controllable release of the liquid, and a porous indicator strip disposed adjacent to the capsule, the indicator strip having a display surface, a first portion adjacent the capsule and a second portion opposite the first portion, the indicator strip comprising a dye configured to adhere to the indicator strip. The indicator strip is configured to diffuse the dye to from the first portion toward the second portion at a predetermined rate and form a line of demarcation along the indicator strip to indicate elapsed time.

The details of one or more embodiments are set forth in the accompanying drawings and the description below. Other features and advantages will be apparent from drawing and descriptions, and from the claims.

DETAILED DESCRIPTION

Figure 1:
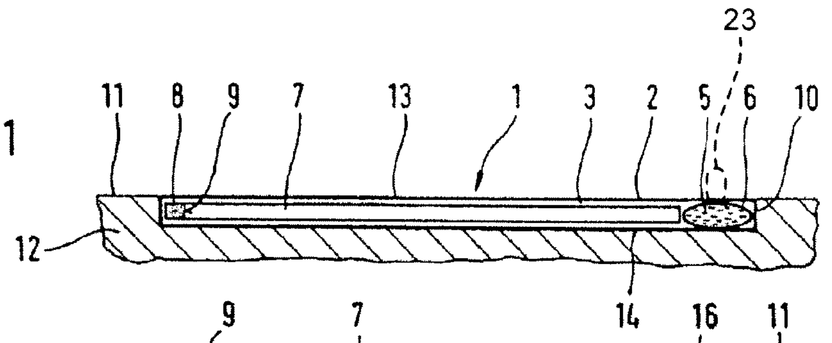
FIG. 1 is a longitudinal cross-section through the display device on an enlarged scale, wherein the schematically shown display device is arranged in a recess of a wall of a component which is shown only in part.
Figure 2:
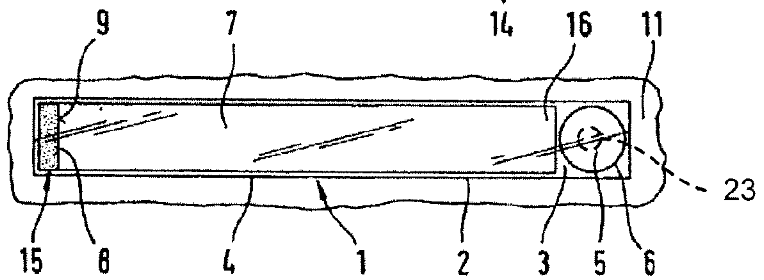
FIG. 2 is a plan view of the display device fixed to a component in FIG. 1.

In FIGS. 1 and 2 the display device 1 consists of a narrow elongated protective cladding 2 which is sealed in a pressure- and watertight fashion and which has a receiving compartment 3 which extends to approximately the same length and width as the protective cladding 2 itself. The thin wall 4 of the protective cladding 2 consists of a watertight, transparent plastic, preferably of chlorotrifluoroethylene (CTFE), such as ACLAR® (manufacturer: Honeywell, Morristown, N.J.), for example, or cyclic olefin copolymer (COC), such as TOPAS® (manufacturer: Ticona GmbH Corporation, Frankfurt, Germany), for example. These materials can reduce or prevent the passage of water from the protective cladding 2.

According to FIGS. 1 and 2, located at the right end of the receiving compartment 3 is a capsule 6 filled with water 5 which serves as a storage chamber for the water 5. In the exemplary embodiment from FIGS. 1 and 2 the capsule 6 is still completely filled with water 5. Adjacent to the capsule 6 on the left is a narrow indicator strip 7 which almost completely fills the receiving compartment 3, except for the area around the capsule 6. At the left end the indicator strip 7 is impregnated, printed or otherwise provided with a dye 8 whose sharp dividing line 9 representing the color transition from the dye to the lighter section of the indicator strip, runs substantially perpendicular to the longitudinal direction of the display device 1 or the indicator strip 7. The dye 8 is shown dark in the drawing and extends over the entire width but in the new state only over a very small length of the indicator strip 7. The dye 8 used here can be Erythrosin B or Coomassie Brilliant Blue G250.

The display device 1 according to FIG. 1 is inserted in a recess 10 of a surface 11 of a component, preferably a toothbrush handle 12, toothbrush or bristle receptacle or toothbrush neck such that it completely fills the recess 10 and its visible surface 13 ends flush with the surface 11. This avoids sharp edges. The display device 1 can be glued in, clipped in, welded in or otherwise fixed in the recess 10. Whereas at least the visible surface 13 is constructed as transparent, the underside of the protective cladding 2 can be constructed as non-transparent for example which is possibly advantageous for cost reasons. However, if the display device 1 is used such that the time can be measured from both sides 13, 14, both sides must be constructed as transparent.

In FIGS. 1 and 2 the toothbrush handle 12 is shown only partly cutaway or viewed from above. Instead of a toothbrush handle 12, any wall component of a device or any other workpiece can naturally also be used if the usage time or other states are to be measured time-dependently using this workpiece.

The mode of action of the display device 1 works as follows:

In the nonactuated state of the display device, that is as long as a user does not remove the manual toothbrush from its packaging and uses it for the first time, the color scale 15 constructed on the indicator strip 7 is already indicated with the corresponding color at the lowest end. When the toothbrush is now used for the first time, a finger of the user (not shown) must first press from above onto the wall 4 of the protective cladding 2 as shown in FIG. 1. The capsule can also be opened automatically during the opening process of the packaging. Alternatively, the toothbrush has a pressure pin 23 whose actuation bursts the capsule. The pressure pin 23 is accordingly arranged adjacent to the capsule. The pressure pin 23 allows easier handling by which means the capsule is made to burst.

Since the protective cladding 2 is constructed elastically, in the first case it transfers the pressure to the capsule 6 which, when pressed sufficiently firmly, bursts. The liquid 5 contained in the capsule 6, in this case water, now flows into the receiving compartment 3 of the protective cladding 2 and applies this to the right end 16 of the indicator strip 7 (not shown) as shown in FIGS. 1 and 2. From there the water 5 now diffuses into the indicator strip 7 and migrates as far as the color scale 15, where the water 5 dissolves the dye 8 located in the indicator strip 7. Since this process takes place very rapidly, this is insignificant for the time measurement. The now colored water 5 now diffuses time-dependently over a very long time from left to right as shown in FIGS. 1 and 2.

Figure 3:
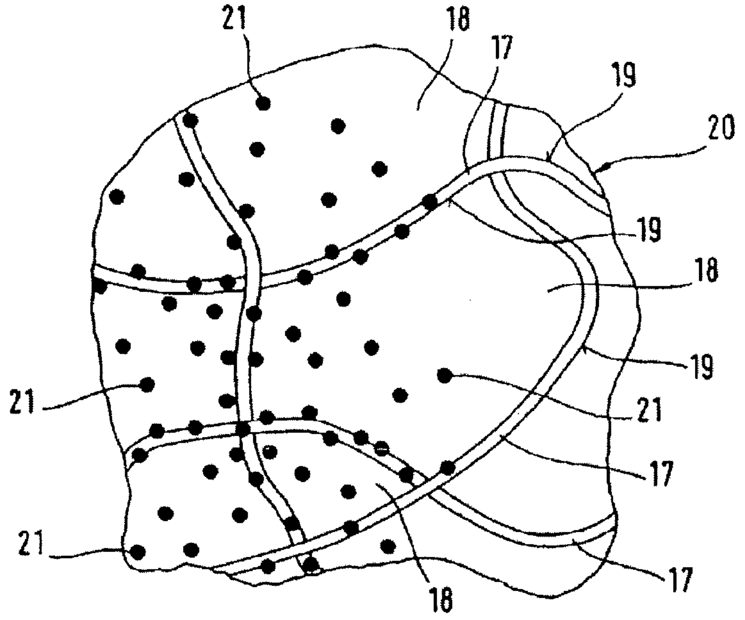
FIG. 3 is a schematic diagram of the microstructure of a cellulose filter paper in which individual dye particles of a dye have already deposited on the walls.
Figure 4:
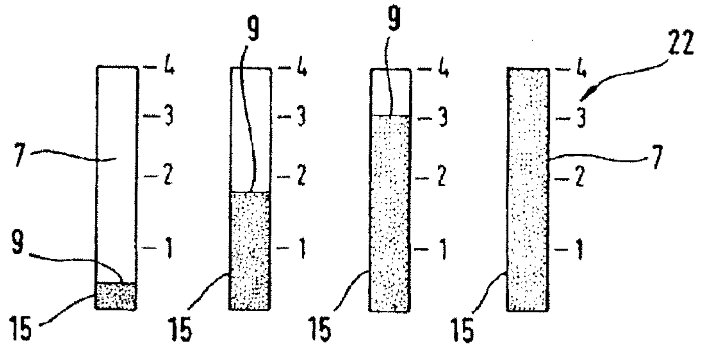
FIG. 4 is a front view of four display devices reproducing different time intervals, wherein the first display device shows the new state and the last display device shows the state after the time has elapsed and wherein the dimensions are smaller than is reproduced in the exemplary embodiment from FIGS. 1 and 2.

FIG. 3 shows a highly simplified microscopic diagram of a cellulose material of the filter strip 7 wherein the dye molecules 21 which in practice are very much smaller however and are barely visible, wriggle to and fro between the pores or chambers 18 formed by the individual fibers 17 and thus diffuse slowly from left to right in the indicator strip according to FIGS. 1 and 2 and from bottom to top in FIG. 4. In this case, as a result of the composition of the dye material some dye molecules 18 reach the boundary surface 19 of the fibers 17 and are bound thereto as a result of the action of forces of attraction. And this is especially because the condition of the dye and the cellulose 20 which consists of many fibers 17 shown in FIG. 3 allows this docking. At those points where dye molecules 18 already adhere to the boundary surfaces 19 of the fibers 17, further dye molecules 18 will only adhere more or less. The remainder diffuse further in the indicator strip 7 toward the right end 16. As a result of the adhesion of the dye molecules 18 to the boundary surface 19 of the fibers 17, an extremely sharp dividing line 9 is formed if the indicator strip 7 consists of differently colored, preferably lighter material. Thus, the lighter is the indicator strip 7 and the darker is the color scale 15, the more clearly the time can be read off.

FIG. 4 shows four time states of the display device 1 where the left shows the beginning, the next shows half, the following shows approximately three quarters and the last display device 1 shows the sequence of the time measurement. For simplicity, only the section of the indicator strip 7 itself is shown in FIG. 4 and a scale 22 of for example, 1 to 4 is shown alongside so that the time elapsed can be read off as rapidly as possible. The numbers 1 to 4 can be hours, months or even years depending on how rapidly the diffusion is initiated with correspondingly selected dyes 8 and celluloses 20. Since the diffusion process is usually always slower, the longer it lasts and because there are different diffusion rates depending on the particular configuration, the scale must be matched to the rate of the diffusion process to show the real time behavior.

The invention claimed is:

1. A method for displaying a time-dependent process, the method comprising:

- providing a toothbrush having a porous indicator strip disposed on its surface, the indicator strip having:
  - a first portion,
  - a second, opposite-portion, the second portion having a dye pre-applied thereto, and
  - a display surface extending between the first and second portions;
- applying a liquid onto the first portion of the porous indicator strip
- allowing the liquid to migrate along a length of the display surface from the first portion to the second portion, causing the dye to dissolve in the liquid; and then
- diffusing the dye along the length of the display surface from the second portion toward the first portion.

2. The method of claim 1 wherein the strip is pre-impregnated with the dye.

3. The method of claim 1 wherein the strip is pre-printed with the dye.

4. The method of claim 1 wherein the strip has been conditioned to cause molecules of the dye to adhere to the strip.

5. The method according to claim 1, further comprising providing the liquid within a storage capsule located adjacent the first portion of the indicator strip.

6. The method according to claim 5, further comprising applying the liquid to the indicator strip from the storage capsule.

7. The method according to claim 6, further comprising opening the capsule by applying mechanical pressure to a flexible cladding substantially surrounding the indicator strip and the capsule.

8. The method according to claim 6, further comprising opening the capsule by actuating a pressure pin arranged adjacent the capsule.

9. The method according to claim 1, wherein the liquid comprises water.

10. The method according to claim 1, wherein the dye comprises Erythrosin B or Coomassie Brilliant Blue.

11. The method according to claim 1, wherein the indicator strip comprises cellulose paper.

12. A display device for a toothbrush, the device comprising:

- a capsule to store a liquid and comprising a seal for controllable release of the liquid; and
- a porous indicator strip disposed adjacent to the capsule, the indicator strip having:
  - a first portion adjacent the capsule,
  - a second portion opposite the first portion, the second portion having a dye pre-applied thereto, and
  - a display surface extending between the first and second portions,
- wherein the indicator strip is configured to allow the liquid to migrate along a length of the display surface from the first portion to the second portion, causing the dye to dissolve in the liquid; and then diffuse the dye along the length of the display surface from the second portion toward the first portion.

13. The device of claim 12, further comprising a scale located adjacent the indicator strip to provide an indication of elapsed time.

14. The device according to claim 12, wherein the dye is disposed along the second portion of the indicator strip.

15. The device according to claim 12, wherein the device is configured to introduce the liquid from the capsule to the dye along the indicator strip.

16. The device according to claim 12, wherein the liquid comprises water.

17. The device according to claim 12, wherein the dye comprises Erythrosin B or Coomassie Brilliant Blue.

18. The device according to claim 12 wherein the indicator strip comprises cellulose filter paper.

19. The device according to claim 12, further comprising a protective cladding substantially surrounding the indicator strip and the capsule.

20. The device according to claim 19, further comprising a mechanical pressure device arranged on an opposite side of the indicator strip facing away from the display surface configured to actuate and burst the capsule.

21. The device of claim 12 wherein the porous substrate is impregnated with the dye prior to release of the liquid.

22. The device of claim 12 wherein the porous substrate is printed with the dye prior to release of the liquid.

23. A toothbrush comprising:

- a capsule to store a liquid and comprising a seal for controllable release of the liquid; and
- a porous indicator strip disposed adjacent to the capsule, the indicator strip having:
  - a first portion adjacent the capsule,
  - a second portion opposite the first portion, the second portion having a dye pre-applied thereto, and
  - a display surface extending between the first and second portions,
- wherein the indicator strip is configured to allow the liquid to migrate along a length of the display surface from the first portion to the second portion, causing the dye to dissolve in the liquid; and then diffuse the dye along the length of the display surface from the second portion toward the first portion.

24. The toothbrush of claim 23, wherein the porous indicator strip is disposed on a handle of the toothbrush.

* * * * *

UNITED STATES PATENT AND TRADEMARK OFFICE

CERTIFICATE OF CORRECTION

PATENT NO. : 7,593,290 B2
APPLICATION NO. : 10/565249
DATED : September 22, 2009
INVENTOR(S) : Pedro Stange and Klaus Horbaschek It is certified that error appears in the above-identified patent and that said Letters Patent is hereby corrected as shown below:

Cover page, col. 2, (57) ABSTRACT, delete "The invention relates to a display device (1) for time-dependent processes, especially for displaying the change of a used toothbrush. The display device (1) consists of a storage chamber (6) containing a liquid and a porous indicator strip (7), which is provided at one point with a dye (8) which dissolves in the liquid (5), which after dissolving in the liquid (5), colors the indicator strip (7) time-dependently over its length. The material of the indicator strip (7), the liquid (5) and the dye (8) are matched to one another such that dye molecules (18) can adhere to the indicator strip (7) until the boundary surfaces (19) of the pores (18) are covered with dye molecules (21) while the remainder of the dye molecules (21) diffuse further in the liquid (5) and the adhesion process thus proceeds time-dependently. This produces a sharp color front." and insert --A method for displaying a time-dependent process including applying a liquid onto a porous indicator strip disposed on a toothbrush, the strip having a first portion and a second portion opposite the first portion and containing a dye and diffusing the dye along the length of the indicator strip at a predetermined rate.--

Signed and Sealed this

Seventeenth Day of November, 2009

David J. Kappos

David J. Kappos
*Director of the United States Patent and Trademark Office*